US011952457B2

(12) United States Patent
Policastro

(10) Patent No.: US 11,952,457 B2
(45) Date of Patent: Apr. 9, 2024

(54) BIOABSORBABLE RESIN FOR ADDITIVE MANUFACTURING WITH NON-CYTOTOXIC PHOTOINITIATOR

(71) Applicant: Carbon, Inc., Redwood City, CA (US)

(72) Inventor: Gina Michelle Policastro, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 2 days.

(21) Appl. No.: 17/853,180

(22) Filed: Jun. 29, 2022

(65) Prior Publication Data
US 2023/0002550 A1  Jan. 5, 2023

Related U.S. Application Data

(60) Provisional application No. 63/216,954, filed on Jun. 30, 2021.

(51) Int. Cl.
| *B33Y 70/00* | (2020.01) |
| *B33Y 10/00* | (2015.01) |
| *B33Y 80/00* | (2015.01) |
| *C08G 63/08* | (2006.01) |
| *C08G 63/78* | (2006.01) |
| *C08K 5/00* | (2006.01) |
| *C08K 5/11* | (2006.01) |

(52) U.S. Cl.
CPC .............. *C08G 63/08* (2013.01); *B33Y 70/00* (2014.12); *C08G 63/78* (2013.01); *C08K 5/0025* (2013.01); *C08K 5/11* (2013.01); *B33Y 10/00* (2014.12); *B33Y 80/00* (2014.12); *C08G 2230/00* (2013.01)

(58) Field of Classification Search
CPC ...... C08G 63/912; C08G 63/08; C08G 63/78; C08G 2230/00; C08F 299/0492; C08F 299/00; B33Y 70/00; B33Y 10/00; B33Y 80/00; C08K 5/11; C08K 5/0025
USPC .......... 528/355, 354, 271; 520/1; 522/6, 71, 522/189, 184, 1
See application file for complete search history.

(56) References Cited

U.S. PATENT DOCUMENTS

| 3,213,058 A | 10/1965 | Boyle et al. |
| 5,236,637 A | 8/1993 | Hull |
| 5,391,072 A | 2/1995 | Lawton et al. |
| 5,529,473 A | 6/1996 | Lawton et al. |
| 6,916,867 B2 | 7/2005 | Gugumus |
| 7,157,586 B2 | 1/2007 | Wood et al. |
| 7,438,846 B2 | 10/2008 | John |
| 7,695,643 B2 | 4/2010 | Fritzsche et al. |
| 7,892,474 B2 | 2/2011 | Shkolnik et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,770,241 B2 | 9/2017 | Rousseau et al. |
| 9,873,790 B1 | 1/2018 | Andjelic et al. |
| 10,085,745 B2 | 10/2018 | Dalessandro et al. |
| 10,149,753 B2 | 12/2018 | Chen et al. |
| 10,975,224 B2 | 4/2021 | Yamada et al. |
| 11,020,947 B2 | 6/2021 | Lim et al. |
| 11,027,312 B2 | 6/2021 | Hinzmann et al. |
| 11,029,541 B2 | 6/2021 | Chiu et al. |
| 11,466,121 B2 | 10/2022 | Gu et al. |
| 2009/0004243 A1 | 1/2009 | Pacetti et al. |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2017/0355815 A1 | 12/2017 | Becker et al. |
| 2018/0126630 A1 | 5/2018 | Panzer et al. |
| 2018/0243976 A1 | 8/2018 | Feller |
| 2018/0290374 A1 | 10/2018 | Willis et al. |
| 2019/0240385 A1 | 8/2019 | Hartwell et al. |
| 2019/0269817 A1 | 9/2019 | Williams et al. |
| 2021/0077094 A1 | 3/2021 | Harris et al. |
| 2021/0077095 A1 | 3/2021 | Harris et al. |
| 2021/0077096 A1 | 3/2021 | Harris et al. |
| 2021/0077097 A1 | 3/2021 | Harris et al. |
| 2021/0077098 A1 | 3/2021 | Harris et al. |
| 2021/0077103 A1 | 3/2021 | Harris et al. |
| 2021/0077104 A1 | 3/2021 | Harris et al. |
| 2021/0077105 A1 | 3/2021 | Harris et al. |
| 2021/0077106 A1 | 3/2021 | Harris et al. |
| 2021/0077107 A1 | 3/2021 | Harris et al. |
| 2021/0077108 A1 | 3/2021 | Harris et al. |
| 2021/0077109 A1 | 3/2021 | Harris et al. |
| 2023/0019076 A1 | 1/2023 | Gu et al. |

FOREIGN PATENT DOCUMENTS

| JP | 2021521285 A | 8/2021 | |
| WO | 2006055940 A2 | 5/2006 | |
| WO | 2019195763 A1 | 10/2019 | |
| WO | WO-2019195763 A1 * | 10/2019 | ........... B29C 64/124 |
| WO | 2021055458 A1 | 3/2021 | |

OTHER PUBLICATIONS

Gauss et al, alpha-ketoesters of nanoaromatic photoinitiators for radical polymerization of (meth)acrylates, Mar. 22, 2019, macromolecules, 52, 2814-2821 (Year: 2019).*

International Search Report and Written Opinion corresponding to PCT/ US2020/051047; dated Jan. 14, 2021 (8 pages).

Elomaa, Laura , et al., "Preparation of poly(ϵ-caprolactone)-based tissue engineering scaffolds by stereolithography", Acta Biomaterialia, 7(11), 2011, 3850-3856.

(Continued)

*Primary Examiner* — Jessica Whiteley
(74) *Attorney, Agent, or Firm* — Myers Bigel, P.A.

(57) ABSTRACT

A resin useful for producing objects is provided, which resin contains a photoinitiator of low cytotoxicity. The resins may be suitable for use in additive manufacturing techniques such as bottom-up and top-down stereolithography, produce objects that are bioresorbable and non-cytotoxic, and/or produce objects that are flexible or elastic. Methods of use of the resin and objects produced therefrom are also provided.

26 Claims, No Drawings

(56) References Cited

OTHER PUBLICATIONS

Gauss, Paul, et al., "Advanced additives for radical photopolymerization", Technical University of Vienna, Ph.D. Thesis Dissertation, 2019, (221 pages).
Gauss, Paul, et al., "α-Ketoesters as Nonaromatic Photoinitiators for Radical Polymerization of (Meth)acrylates", Macromolecules, 52(7), 2019, 2814-2821.
Hosoyama, Katsuhiro, et al., "Peptide-Based Functional Biomaterials for Soft-Tissue Repair", Frontiers in Bioengineering and Biotechnology, 7(Article 205), 2019, 1-19.
Janusziewicz, Rima, et al., "Layerless fabrication with continuous liquid interface production", PNAS, 113(42), 2016, 11703-11708.
Melchels, Ferry P.W., et al., "Effects of the architecture of tissue engineering scaffolds on cell seeding and culturing", Acta Biomaterialia, 6(11), 2010, 4208-4217.
Tumbleston, John R., et al., "Continuous liquid interface production of 3D Objects", Science, 347(6228), 2015, 1349-1352.
Japanese Office Action corresponding to JP 2022-517296; dated Apr. 4, 2023 (8 pages, including English translation).
Japanese Decision of Rejection corresponding to JP 2022-517296; dated Sep. 26, 2023 (5 pages, including English machine translation).

\* cited by examiner

BIOABSORBABLE RESIN FOR ADDITIVE MANUFACTURING WITH NON-CYTOTOXIC PHOTOINITIATOR

CROSS-REFERENCE TO RELATED APPLICATIONS

This application claims the benefit of Provisional Application No. 63/216,954, filed Jun. 30, 2021, the disclosures of which are incorporated by reference herein.

BACKGROUND

Bioresorbable resins for additive manufacturing are described in, for example, X. Gu, S. Chen, G. Policastro et al., PCT Application Publication No. WO 2021/055458 (Published 25 Mar. 2021). While these resins provide for flexible or elastic properties in the objects made, there remains a need for additive manufacturing resins which include a photoinitiator that is suitable for the unique requirements of additive manufacturing, while at the same time does not present substantial cytotoxicity when implanted into a subject.

SUMMARY

A first aspect of the present disclosure is a resin useful for producing objects, which resin contains photoinitiator of low cytotoxicity. The resins may be suitable for use in additive manufacturing techniques such as bottom-up and top-down stereolithography, produce objects that are bioresorbable and non-cytotoxic, and/or produce objects that are flexible or elastic (preferably at least typical room temperatures of about 25° C., and in some embodiments at typical human body temperatures of about 37° C.). Such resins typically include: (a) a bioresorbable polyester oligomer having reactive end groups; (b) non-reactive diluent; (c) optionally a reactive diluent; (d) dihydro-4,4-dimethyl-2,3-furandione (DDFD), and (e) optionally a dye or pigment.

In some embodiments, a photopolymerizable resin useful for the additive manufacturing of a bioresorbable object comprises or consists essentially of: (a) from 5 or 10 percent by weight to 80 or 90 percent by weight of a photopolymerizable bioresorbable polyester oligomer; (b) from 1 or 5 percent by weight to 50 or 70 percent by weight of non-reactive diluent; (c) from 0.1 or 0.2 percent by weight to 2, 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 or 5 percent by weight to 40 or 50 percent by weight of reactive diluent; (f) optionally, from 1 or 2 percent by weight to 40 or 50 percent by weight of filler; and (g) optionally, from 1 or 2 percent by weight to 5 or 10 percent by weight of at least one additional cross-linking agent, such as trimethylolpropane trimethacrylate (TMPTMA).

In some embodiments, the oligomer comprises a (meth)acrylate terminated and/or thiol terminated bioresorbable polyester oligomer.

In some embodiments, the oligomer comprises a linear oligomer.

In some embodiments, the oligomer comprises a branched oligomer (i.e., a star oligomer, such as a tri-arm oligomer).

In some embodiments, the oligomer comprises degradable ester linkages between constituents selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, wherein:
  A=poly(lactide) (PLA), poly(glycolide) (PGA), poly(lactide-co-glycolide) (PLGA), or polypropylene fumarate (PPF),
  B=polycaprolactone (PCL), polytrimethylene carbonate (PTMC), or poly(caprolactone-co-lactide) (PCLLA), and
  C=polydioxanone (PDX).

In some embodiments, the oligomer has a molecular weight (Mn) of from 2 or 5 kilodaltons to 6, 10, 15 or 20 kilodaltons.

In some embodiments, the oligomer comprises an ABA block, a BAB block, a CBC block, or a BCB block in linear and/or branched (e.g., star or tri-arm) form.

In some embodiments, A is: (i) poly(lactide); (ii) poly(glycolide); (iii) poly(lactide-co-glycolide) containing lactide and glycolide in a molar ratio of (i) from 90:10 to 55:45 lactide:glycolide (i.e., a lactide rich ratio) or (ii) from 45:55 to 10:90 lactide:glycolide (i.e., a glycolide rich ratio); or any combination of the foregoing.

In some embodiments, B is: (i) polycaprolactone; (ii) polytrimethylene carbonate; (iii) poly(caprolactone-co-lactide) containing caprolactone and lactide in a molar ratio of 95:5 to 5:95 caprolactone:lactide; or any combination of the foregoing.

In some embodiments, A (PLA, PGA, PLGA, PPF, or a combination thereof) has a molecular weight (Mn) of from 1,000 or 2,000 daltons, up to 4,000, 6,000 or 10,000 daltons); and B (PCL, PTMC, PCLLA, or a combination thereof) has a molecular weight (Mn) of from 1,000 or 1,600 daltons, up to 4,000, 6,000 or 10,000 daltons.

In some embodiments, the non-reactive diluent is selected from the group consisting of dimethylformamide, dimethylacetamide, N-methyl pyrrolidone (NMP), dimethyl sulfoxide, cyclic carbonate (such as propylene carbonate), diethyl adipate, methyl ether ketone, ethyl alcohol, acetone, and combinations thereof.

In some embodiments, the non-reactive diluent is propylene carbonate.

In some embodiments, the reactive diluent comprises an acrylate, a methacrylate, a styrene, a vinylamide, a vinyl ether, a vinyl ester, polymers containing any one or more of the foregoing, or a combination of two or more of the foregoing.

In some embodiments, the resin includes at least one additional ingredient selected from: pigments, dyes, active compounds or pharmaceutical compounds, and detectable compounds (e.g., fluorescent, phosphorescent, radioactive), and combinations thereof.

In some embodiments, the resin includes a filler (e.g., bioresorbable polyester particles, sodium chloride particles, calcium triphosphate particles, sugar particles).

In some embodiments, the resin consists essentially of: (a) from 5 or 10 percent by weight to 80 or 90 percent by weight of a (meth)acrylate terminated, linear or branched, bioresorbable polyester oligomer of monomers in an ABA block, a BAB block, a CBC block, or a BCB block, wherein: A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide (i.e., a lactide rich ratio) or 40:60 to 10:90 lactide:glycolide (i.e., a glycolide rich ratio), and A has a molecular weight (Mn) of from 1,000 or 2,000 daltons, up to 4,000 or 10,000 daltons); B is polycaprolactone (PCL, PTMC, PCLLA) and has a molecular weight (Mn) of from 1,000 or 1,600 daltons, up to 4,000 or 10,000 daltons; and C is polydioxanone (PDX) and has a molecular weight (Mn) of from 1,000 or 2,000 daltons, up to 4,000 or 10,000 daltons); (b) from 1 or 5 percent by weight to 50 or 70 percent by weight of propylene carbonate; (c) from 0.1 or 0.2 percent by weight to 2, 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 or 5 percent by weight to 40 or 50 percent by weight of reactive diluent; and (f) optionally, from 1 or 2 percent by weight to 40 or 50 percent by weight of filler.

In some embodiments, the resin consists essentially of: (a) from 10 percent by weight to 80 percent by weight of (meth)acrylate terminated, bioresorbable, branched polyester oligomer; wherein said branched oligomer comprises degradable ester linkages between constituents in an ABA block, BAB block, or AB random composition, where A is poly(lactide) or poly(lactide-co-glycolide), B is polycaprolactone or poly(caprolactone-co-lactide), and said oligomer has a molecular weight (Mn) of from 2 to 6 kilodaltons; (b) from 5 percent by weight to 50 percent by weight of non-reactive diluent selected from the group consisting of N-methyl pyrrolidone (NMP) and propylene carbonate; (c) from 0.2 percent by weight to 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 percent by weight to 50 percent by weight of reactive diluent; (f) optionally, from 1 percent by weight to 50 percent by weight of filler; and (g) optionally, from 1 percent by weight to 10 percent by weight of additional crosslinking agent.

In some embodiments, the UV light absorber comprises a heterocyclic aromatic compound. In some embodiments, the UV light absorber is selected from the group consisting of anthraquinones, indoles, benzopteridines, benzotriazoles, benzophones, resorcinols, benzoxazinones, and combinations thereof.

In some embodiments, the UV light absorber is: Solvent Green Dye 3 (also called D&C Green Dye No. 6 or 1,4-bis(p-tolylamino)anthraquinone (cas #128-80-3); Solvent Violet 13 (also called D&C Violet No 2 or Quinizarin Blue (cas #81-48-1); Indigo (D&C Blue no 6) (cas #482-89-3); riboflavin tetrabutyrate (cas #752-56-7); riboflavin (cas #83-88-5); or any combination thereof.

Also provided is a method of making a flexible or elastic bioresorbable object, comprising producing said object by photopolymerizing a resin as taught herein (e.g., by photopolymerization with UV light) in the shape of the object (e.g., by additive manufacturing, such as by bottom-up or top-down additive manufacturing).

In some embodiments, the method further includes cleaning said object (e.g., by washing, wiping, spinning, etc.) after said producing step (but preferably before said step of exposing said object to additional light).

In some embodiments, the method further includes exposing said object to additional light after said producing step to further react unpolymerized constituents therein.

In some embodiments, the method further includes extracting residual diluent from said object after said producing step.

In some embodiments, the method further includes drying said object (optionally but preferably under a vacuum) to remove extraction solvents therefrom.

In some embodiments, the method includes producing said object in enlarged form to offset shrinkage of said object that occurs during said extracting, further exposing, cleaning, and/or drying steps.

In some embodiments, the object comprises a soft tissue implant.

Further provided is a flexible or elastic bioresorbable object produced by a method as taught herein (e.g., a soft tissue implant).

DDFD has been noted to be a low cytotoxicity photoinitiator for radical polymerization of (meth)acrylates, but it has not been suggested as suitable for bioresorbable resin systems, particularly those used to produce flexible or elastic bioresorbable objects (see, e.g., P. Gauss et al., *alpha-Ketoesters as nonaromatic photoinitiators for radical polymerization of (meth)acrylates*, Macromolecules (2019); P. Gauss et al., *Advanced additives for radical photopolymerization* (Ph.D. Thesis 2019).

Additional aspects of the present invention are explained in greater detail below.

DETAILED DESCRIPTION

The present invention is now described more fully hereinafter. This invention may, however, be embodied in many different forms and should not be construed as limited to the embodiments set forth herein; rather, these embodiments are provided so that this disclosure will be thorough and complete and will fully convey the scope of the invention to those skilled in the art.

The terminology used herein is for the purpose of describing embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

The disclosures of all patent references cited herein are to be incorporated herein by reference in their entirety.

1. Polymer Materials and Resins.

Resins are provided that are useful for producing objects, which resins contain a photoinitiator of low cytotoxicity. The resins may be suitable for use in additive manufacturing techniques such as bottom-up and top-down stereolithography, produce objects that are bioresorbable and non-cytotoxic, and/or produce objects that are flexible or elastic (preferably at least typical room temperatures of about 25° C., and in some embodiments at typical human body temperatures of about 37° C.). Such resins may comprise, consist essentially of or consist of: (a) a bioresorbable polyester oligomer having reactive end groups; (b) non-reactive diluent; (c) optionally a reactive diluent; (d) dihydro-4,4-dimethyl-2,3-furandione (DDFD), and (e) optionally a dye or pigment.

In some embodiments, a photopolymerizable resin useful for the additive manufacturing of a bioresorbable object comprises or consists essentially of: (a) from 5 or 10 percent by weight to 80 or 90 percent by weight of a photopolymerizable bioresorbable polyester oligomer; (b) from 1 or 5 percent by weight to 50 or 70 percent by weight of non-reactive diluent; (c) from 0.1 or 0.2 percent by weight to 2, 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 or 5 percent by weight to 40 or 50 percent by weight of reactive diluent; (f) optionally, from 1 or 2 percent by weight to 40 or 50 percent by weight of filler; and (g) optionally, from 1 or 2 percent by weight to 5 or 10 percent by weight of at least one additional cross-linking agent, such as trimethylolpropane trimethacrylate (TMPTMA).

Oligomer prepolymers for these resins from which the polymers may be produced are branched (e.g., "star" oligomers such as tri-arm oligomers). Suitable end groups for such monomers or oligomer prepolymers include, but are not limited to, acrylate, methacrylate, thiol, fumarate, vinyl carbonate, methyl ester, ethyl ester, etc. In some embodiments, the oligomer comprises a (meth)acrylate terminated and/or thiol terminated bioresorbable polyester oligomer. In some embodiments, the oligomer comprises a linear oligomer. In some embodiments, the oligomer comprises a branched oligomer (i.e., a star oligomer, such as a tri-arm oligomer).

In some embodiments, the oligomer comprises degradable ester linkages between constituents selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, wherein:
  A=poly(lactide) (PLA), poly(glycolide) (PGA), poly(lactide-co-glycolide) (PLGA), or polypropylene fumarate (PPF),
  B=polycaprolactone (PCL), polytrimethylene carbonate (PTMC), or poly(caprolactone-co-lactide) (PCLLA), and
  C=polydioxanone (PDX).

Non-limiting examples of suitable resin compositions are given in Table 1 below (where constituents in each column can be combined with constituents of the other columns in any combination).

TABLE 1

| Backbone Chemistry | Reactive End Group | Oligomer Architecture | Diluent | Photo-initiator | Dye |
|---|---|---|---|---|---|
| PLGA | Meth-acrylate | Linear | PC | DDFD | D&C Green Dye #6 |
| PCL | Acrylate | Star (branching) | NMP | DDFD | |
| PLGA-PCL-PLGA | Vinyl Carbonate | | DMSO | DDFD | |
| PLGA-PCL | | | PC | DDFD | Riboflavin tetra-butyrate |

PLGA = poly(lactic-co-glycolic acid);
PCL=polycaprolactone;
NMP = N-methyl pyrrolidone;
DMSO = dimethylsulfoxide;
PC = propylene carbonate;
DDFD = dihydro-4,4-dimethyl-2,3-furandione In some embodiments, the oligomer has a molecular weight (Mn) of from 2 or 5 kilodaltons to 6, 10, 15 or 20 kilodaltons.

In some embodiments, the oligomer comprises an ABA block, a BAB block, a CBC block, or a BCB block in linear and/or branched (e.g., star or tri-arm) form.

In some embodiments, A is: (i) poly(lactide); (ii) poly(glycolide); (iii) poly(lactide-co-glycolide) containing lactide and glycolide in a molar ratio of (i) from 90:10 to 55:45 lactide:glycolide (i.e., a lactide rich ratio) or (ii) from 45:55 to 10:90 lactide:glycolide (i.e., a glycolide rich ratio); or any combination of the foregoing.

In some embodiments, B is: (i) polycaprolactone; (ii) polytrimethylene carbonate; (iii) poly(caprolactone-co-lactide) containing caprolactone and lactide in a molar ratio of 95:5 to 5:95 caprolactone:lactide; or any combination of the foregoing.

In some embodiments, A (PLA, PGA, PLGA, PPF, or a combination thereof) has a molecular weight (Mn) of from 1,000 or 2,000 daltons, up to 4,000, 6,000 or 10,000 daltons); and B (PCL, PTMC, PCLLA, or a combination thereof) has a molecular weight (Mn) of from 1,000 or 1,600 daltons, up to 4,000, 6,000 or 10,000 daltons.

A particular embodiment is a resin consisting essentially of: (a) from 5 or 10 percent by weight to 80 or 90 percent by weight of a (meth)acrylate terminated, branched, bioresorbable polyester oligomer of monomers in an ABA block, a BAB block, a CBC block, or a BCB block, wherein: A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide (i.e., a lactide rich ratio) or 40:60 to 10:90 lactide:glycolide (i.e., a glycolide rich ratio), and A has a molecular weight (Mn) of from 1,000 or 2,000 daltons, up to 4,000, 6,000 or 10,000 daltons; B is polycaprolactone (PCL), polytrimethylene carbonate (PTMC), or poly(caprolactone-co-lactide) (PCLLA) and has a molecular weight (Mn) of from 1,000 or 1,600 daltons, up to 4,000, 6,000 or 10,000 daltons; and C is polydioxanone (PDX) and has a molecular weight (Mn) of from 1,000 or 2,000 daltons, up to 4,000 or 10,000 daltons; (b) from 1 or 5 percent by weight to 50 or 70 percent by weight of a non-reactive diluent such as propylene carbonate; (c) from 0.1 or 0.2 percent by weight to 2 or 8 percent by weight of photoinitiator, (d) optionally, from 0.01 or 0.2 percent by weight of a dye or pigment.

Non-reactive diluents that can be used in carrying out the invention include, but are not limited to, dimethylformamide, dimethylacetamide, N-methyl pyrrolidone (NMP), dimethyl sulfoxide, cyclic carbonate (for example, propylene carbonate), diethyl adipate, methyl ether ketone, ethyl alcohol, acetone, and combinations of two or more thereof.

The dihydro-4,4-dimethyl-2,3-furandione (DDFD) photoinitiator included in these polymerizable liquids (resins) is an alpha-ketoester, Type II photoinitiator that does not require the use of an amine synergist to increase its efficiency. This initiator has been shown to be orders of magnitude less cytotoxic than traditional UV photoinitiators such as BAPO and is a safe alternative to traditional photoinitiators.

A reactive diluent may comprise an acrylate, a methacrylate, a styrene, a vinylamide, a vinyl ether, a vinyl ester, polymers containing any one or more of the foregoing, or a combination of two or more of the foregoing.

The resin can have additional ingredients, including pigments, dyes, and/or non-reactive light absorbers. In some embodiments, resins for carrying out the present invention include a non-reactive pigment or dye that absorbs light, particularly UV light, as a processing aid, for higher resolution printing. A variety of UV light absorbers are known and described in, for example U.S. Pat. Nos. 11,029,541; 11,027,312; 11,020,947; 10,975,224; the disclosures of which are incorporated herein by reference in their entirety.

Thus, in some embodiments, the UV light absorber comprises a heterocyclic aromatic compound.

In some embodiments, the UV light absorber is selected from the group consisting of anthraquinones, indoles, benzopteridines, benzotriazoles, benzophones, resorcinols, benzoxazinones, and combinations thereof.

In some embodiments, the UV light absorber is: Solvent Green Dye 3 (also called D&C Green Dye No. 6 or 1,4-bis(p-tolylamino)anthraquinone (cas #128-80-3); Solvent Violet 13 (also called D&C Violet No 2 or Quinizarin Blue (cas #81-48-1); Indigo (D&C Blue no 6) (cas #482-89-3); riboflavin tetrabutyrate (cas #752-56-7); riboflavin (cas #83-88-5); or a combination thereof.

In some embodiments, the resin includes at least one additional ingredient selected from: active compounds or pharmaceutical compounds, and detectable compounds (e.g., fluorescent, phosphorescent, radioactive), and combinations thereof (e.g., in an amount of from 0.01, 0.1, 1, 2 or 5 percent by weight, to 15, 20, 30, 40 or 50 percent by weight). The methods and resins described herein are useful for making objects described above, particularly where those objects contain one or more such pigments, dyes, active compounds/pharmaceutical compounds, and/or detectable compounds that may be extracted if more aggressive extraction procedures are used to extract photoinitiators such as TPO that are less preferred for implanting into a human patient. Examples of such compounds include, but are not limited to, proteins, peptides, nucleic acids and polynucleic acids, antibodies (including fragments and chimeras thereof), and which may be antimicrobial agents, anesthetic agents, antineoplastic agents, extracellular matrix (ECM) proteins and peptides such as collagen, laminin, fibronectin peptide sequences and the like; remodeling enzymes such as collagenase, matrix metalloproteinases, and the like; target proteins and receptors such as vascular endothelial growth factor (VEGF), transforming growth factor-alpha, transforming growth factor beta, fibroblast growth factor, hepatocyte growth factor, glycosaminoglycan (e.g., hyaluronic acid, heparin sulfate) and the like; other compounds that can promote wound healing, and/or any of the active agents described in U.S. Pat. Nos. 11,160,903; 10,912,551; 10,610,616; 9,132,208, 8,415,159; and 8,377,420, the disclosures of which are incorporated herein by reference. See also K. Hosoyama, C. Lazurko et al., *Peptide-based functional biomaterials for soft tissue repair*, *Frontiers in Bioengineering and Biotechnology* 7, Article 205 (August 2019). In some embodiments, with the milder extraction, etc. that may be used for an object formed with a photoinitiator of low toxicity such as DDFD, as opposed to TPO, more of the active compounds, pharmaceutical compounds, and/or detectable compounds may be retained in the final, ready-to-implant, product (e.g., 30, 40, 50, 60, 70, 80, or 90 percent or more).

In some embodiments, the resin includes a filler (e.g., bioresorbable polyester particles, sodium chloride particles, calcium triphosphate particles, sugar particles).

A particular embodiment is a resin that consists essentially of: (a) from 5 or 10 percent by weight to 80 or 90 percent by weight of a (meth)acrylate terminated, linear or branched, bioresorbable polyester oligomer of monomers in an ABA block, a BAB block, a CBC block, or a BCB block, wherein: A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide (i.e., a lactide rich ratio) or 40:60 to 10:90 lactide:glycolide (i.e., a glycolide rich ratio), and A has a molecular weight (Mn) of from 1,000 or 2,000 daltons, up to 4,000 or 10,000 daltons); B is polycaprolactone (PCL, PTMC, PCLLA) and has a molecular weight (Mn) of from 1,000 or 1,600 daltons, up to 4,000 or 10,000 daltons; and C is polydioxanone (PDX) and has a molecular weight (Mn) of from 1,000 or 2,000 daltons, up to 4,000 or 10,000 daltons); (b) from 1 or 5 percent by weight to 50 or 70 percent by weight of propylene carbonate; (c) from 0.1 or 0.2 percent by weight to 2, 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 or 5 percent by weight to 40 or 50 percent by weight of reactive diluent; and (f) optionally, from 1 or 2 percent by weight to 40 or 50 percent by weight of filler.

An example of an additional crosslinking agent that may be included in the resin is trimethylolpropane trimethacrylate (TMPTMA).

A particular embodiment is a resin that consists essentially of: (a) from 10 percent by weight to 80 percent by weight of (meth)acrylate terminated, bioresorbable, branched polyester oligomer; wherein said branched oligomer comprises degradable ester linkages between constituents in an ABA block, BAB block, or AB random composition, where A is poly(lactide) or poly(lactide-co-glycolide), B is polycaprolactone or poly(caprolactone-co-lactide), and said oligomer has a molecular weight (Mn) of from 2 to 6 kilodaltons; (b) from 5 percent by weight to 50 percent by weight of non-reactive diluent selected from the group consisting of N-methyl pyrrolidone (NMP) and propylene carbonate; (c) from 0.2 percent by weight to 8 or 10 percent by weight of dihydro-4,4-dimethyl-2,3-furandione (DDFD) photoinitiator; (d) an ultraviolet (UV) light absorber (i.e., as a processing aid) (e.g., in an amount of from 0.01 percent by weight to 1, 2 or 5 percent by weight); (e) optionally, from 1 percent by weight to 50 percent by weight of reactive diluent; (f) optionally, from 1 percent by weight to 50 percent by weight of filler; and (g) optionally, from 1 percent by weight to 10 percent by weight of additional crosslinking agent.

2. Methods of Making.

The resins taught herein may be used in a method of making a flexible or elastic bioresorbable object, comprising producing said object by photopolymerizing a resin as taught herein (e.g., by photopolymerization with UV light) in the shape of the object (e.g., by additive manufacturing, such as by bottom-up or top-down additive manufacturing).

Additive manufacturing. Suitable additive manufacturing methods and apparatus on which objects can be produced include bottom-up and top-down additive manufacturing methods and apparatus, as known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, S Patent Application Pub. No. US 2017/0129167. B. Feller, US Pat App. Pub. No. US 2018/0243976; M. Panzer and J. Tumbleston, US Pat App Pub. No. US 2018/0126630; and K. Willis and B. Adzima, US Pat App Pub. No. US 2018/0290374.

Post-production steps. After the additive manufacturing steps, additional post processing steps can include cleaning said object such as by washing (e.g., in an organic solvent such as acetone or isopropanol), wiping, spinning, etc., extraction of residual solvents, additional curing such as by flood exposure with ultraviolet light or the like, drying said object (optionally but preferably under a vacuum) to remove extraction solvents therefrom, and combinations of some or all of the foregoing, in accordance with known techniques.

Post-production steps may also include extracting residual diluent (e.g., residual non-reactive diluent) from said object after said producing step. In some embodiments, the method further includes drying said object (optionally but preferably under a vacuum) to remove extraction solvents therefrom.

In some embodiments, the method includes producing said object in enlarged form to offset shrinkage of said object that occurs during said extracting, further exposing, cleaning, and/or drying steps.

3. Utility.

Resins as described herein are useful for making a variety of biomedical devices and medical aids, including implantable devices such as intravascular stents. The object may be a flexible or elastic bioresorbable object produced by a method as taught herein.

Additional examples of objects that can be made with the resins described herein include, but are not limited to, those set forth in Williams et al., *Surgical Mesh Implants containing poly(butylene succinate) and copolymers thereof*, US Patent Application Pub. No. 2019/0269817, (Sep. 5, 2019) and in Hartwell et al., Collapsible dressing for negative pressure wound treatment, US Patent Application Pub. No. 2019/0240385, the disclosures of which are incorporated by reference herein in their entirety.

In addition to the foregoing, resins as described herein are also useful for making compressible non-fibrous adjuncts, including but not limited to those described in:

J. Harris, M. Vendely, F. Shelton, A. Bridges, P. Hopson, J. Donners, H. Kabaria, F. Javid, D. Kelly, E. Baker, S. Peter, X. Gu, G. Policastro, and S. Chen, Compressible Non-Fibrous Adjuncts, US Patent Application US20210077094 (published Mar. 18, 2021);

J. Harris, M. Vendely, F. Shelton, H. Kabaria, F. Javid, D. Kelly, E. Baker, Compressible Non-Fibrous Adjuncts, US Patent Application US20210077095 (published Mar. 18, 2021);

J. Harris, M. Vendely, F. Shelton, A. Bridges, H. Kabaria, F. Javid, D. Kelly, E. Baker, and S. Peter, Compressible Non-Fibrous Adjuncts, US Patent Application US20210077096 (published Mar. 18, 2021);

J. Harris, M. Vendely, F. Shelton, P. Hopson, J. Donners, H. Kabaria, F. Javid, Compressible Non-Fibrous Adjuncts, US Patent Application US20210077097 (published Mar. 18, 2021);

J. Harris, M. Vendely, F. Shelton, H. Kabaria, and F. Javid, Compressible Non-Fibrous Adjuncts, US Patent Application US20210077098 (published Mar. 18, 2021);

J. Harris, M. Vendely, F. Shelton, H. Kabaria, F. Javid, D. Kelly, and E. Baker, Compressible Non-Fibrous Adjuncts, US Patent Application US20210077103 (published Mar. 18, 2021);

J. Harris, M. Vendely, F. Shelton, H. Kabaria, and F. Javid, Compressible Non-Fibrous Adjuncts, US Patent Application US20210077104 (published Mar. 18, 2021);

J. Harris, M. Vendely, F. Shelton, H. Kabaria, and F. Javid, Compressible Non-Fibrous Adjuncts, US Patent Application US20210077105 (published Mar. 18, 2021);

J. Harris, M. Vendely, F. Shelton, H. Kabaria, and F. Javid, Compressible Non-Fibrous Adjuncts, US Patent Application US20210077106 (published Mar. 18, 2021);

J. Harris, M. Vendely, F. Shelton, Compressible Non-Fibrous Adjuncts, US Patent Application US20210077107 (published Mar. 18, 2021);

J. Harris, M. Vendely, F. Shelton, H. Kabaria, F. Javid, Compressible Non-Fibrous Adjuncts, US Patent Application US20210077108 (published Mar. 18, 2021); and J. Harris, M. Vendely, F. Shelton, Hopson, J. Donners, H. Kabaria, F. Javid, X. Gu, G. Policastro, and S. Chen, Compressible Non-Fibrous Adjuncts, US Patent Application US20210077109 (published Mar. 18, 2021);

the disclosures of all of which are incorporated herein by reference in their entirety.

Soft tissue implants. In addition to the foregoing, resins and methods described herein are useful for making soft tissue implants, including void-filling implants such as breast cancer lumpectomy void fillers, implants configured for the correction of temporalis depressions or hollowing, and the like. See, e.g., U.S. Pat. No. 10,792,141 and US Patent Application Pub. No. 2021/0138110, the disclosures of which are incorporated herein by reference.

The present invention is explained in greater detail in the following non-limiting Examples.

Examples 1-3

Preparation of a Tri-Arm MA Terminated Polyester Oligomer

These examples describe the preparation of a tri-arm, or star shaped, bioresorbable polyester oligomer. Each arm is terminated with methacrylate. Each arm has a molecular weight of 2 kilodaltons and is a block copolymer of poly (L-lactic acid) (PLLA) and poly(caprolactone-r-L-lactic acid) (PCLLA) with PCLLA being the core of the oligomer. The PCLLA is included as 70 wt % of the total MW and the CL:L ratio is 60:40.

Example 1

PCLLA-3OH Synthesis

Refer to Table 2 for an example of the molar ratios and masses of each reagent used for a 1 kg batch of (PLLA-b-PCLLA)-3OH synthesis as the next two sections are discussed.

TABLE 2

Example of molar ratios and mass of each reagent needed to synthesize a 1 kg batch of (PCL-b-PLGA)-3OH.

| Reagent | Molecular Weight (g/mol) | Molar Ratio | Density (g/mol) | Mass (g) | Volume (mL) | Moles |
|---|---|---|---|---|---|---|
| Caprolactone (CL) | 114.14 | 22 | 1.03 | 418 | 405 | 3.66 |
| Trimethylolpropane (TMP) | 134.07 | 1 | 1.08 | 21.4 | 19.8 | 0.16 |
| Stannous Octoate (Sn(Oct)) | 405.12 | $2.38 \times 10^{-3}$ | 1.25 | 0.15 | 0.12 | $3.81 \times 10^{-4}$ |
| L-Lactide (L) | 144.13 | 24 | — | 576 | — | 3.99 |

A round bottom flask was dried in a drying oven overnight and cooled under $N_2$ flow to room temperature. Caprolactone, L-lactide and tin octoate were added to the round bottom flask. The reaction flask contents were heated to 130° C. Meanwhile, trimethylolpropane (TMP) was heated to 130° C. Once preheated, TMP was added to the reaction flask as an initiator and was allowed to react until complete monomer conversion. Monomer conversion was monitored using H1 NMR. The reaction was stopped, and the reaction contents were allowed to cool to room temperature. The (PCLLA)-3OH was precipitated into cold MeOH from chloroform to obtain a white solid. H1 NMR, DSC, FTIR, and THF GPC were used to characterize (PCLLA)-3OH.

Example 2

(PLLA-b-PCLLA)-3OH Synthesis (PCLLA)-3OH and L-lactide were added into a round-bottom flask under $N_2$ and heated to 140° C. to melt the reaction contents. After melting, the temperature was reduced to 120° C. and stannous octoate was added. The reaction continued with stirring while monitoring the monomer conversion with H1 NMR and THF GPC. Once the reaction reached the desired molecular weight, reaction contents were cooled to room temperature, dissolved in chloroform and precipitated into cold diethyl ether three times. The precipitate was dried under vacuum.

Example 3

(PLLA-b-PCLLA)-3MA Synthesis

Refer to Table 3 for an example of the molar ratio and masses of each reagent used to synthesize a 1 kg batch of (PLLA-b-PCLLA)-3MA.

(PLLA-b-PCLLA)-3OH was dissolved in anhydrous DCM in a round bottom flask under $N_2$. Triethylamine (TEA) and a 400 ppm BHT were added the reaction flask and the reaction flask was cooled to 0° C. in an ice water bath. The reaction flask was equipped with a pressure-equalizing addition funnel that was charged with methacrylol chloride. Once the reaction flask reached 0° C., methacrylol chloride was added dropwise over 2 hours. The reaction proceeded for 12 h at 0° C. and then 24 h at room temperature. Once complete, the precipitate was removed via vacuum filtration. The filtrate was collected and DCM was removed with rotary evaporation. The resulting viscous oil was dissolved in THF and precipitated into cold methanol. The precipitate was dissolved in DCM and washed with aqueous HCL (3%, 2 times), saturated aqueous sodium bicarbonate solution, and saturated aqueous sodium chloride, then dried over magnesium sulfate. The magnesium sulfate was filtered off via vacuum filtration, and the filtrate was collected. DCM was removed via rotary evaporation and the solid product was collected and characterized with THF GPC, H1 NMR, FTIR, and DSC.

Example 4

Tri-Arm Oligomer Resin Formulation

The following ingredients were mixed in the following weight percentages to provide a non-toxic, light polymerizable resin for additive manufacturing:
(1) 58.8% of the tri-arm oligomer prepared in Examples 1-3 above;
(2) 34.2% of propylene carbonate (PC) non-reactive diluent; and
(3) 7% of DDFD photoinitiator.

Resin mixing is performed by adding the oligomer, PC and DDFD directly to a thinky cup and mixing at 2000 rpm

TABLE 3

Example of molar ratios and mass of each reagent needed to synthesize a 1 kg batch of (PLGA-b-PCL)-3MA.

| Reagent | Molecular Weight (g/mol) | Molar Ratio | Density (g/mol) | Mass (g) | Volume (mL) | Moles |
|---|---|---|---|---|---|---|
| (PLLA-b-PCLLA)-3OH | 6000 | 1 | — | 1000 | — | 0.17 |
| Methacrylol Chloride (MC) | 104.54 | 4.8 | 1.07 | 83.6 | 78.2 | 0.80 |
| Triethylamine (TEA) | 101.19 | 4.8 | 0.726 | 80.9 | 111.5 | 0.63 |
| Butylated hydroxy-toluene (BHT) | 220.35 | ~400 ppm | | 0.47 | | |
| Dichloromethane (DCM) | — | | 0.2 g/mL | — | 5000 | — | for 20 min. This resin is stable at room temperature and should be stored in a desiccator to protect from light and moisture.

Example 5

Tri-Arm Oligomer Resin Formulation with C&D Green Dye #6

The following ingredients were mixed in the following weight percentages to provide a light polymerizable resin for additive manufacturing:
(1) 52.5% of the tri-arm oligomer prepared in Examples 1-3 above;
(2) 34.2% of propylene carbonate (PC) non-reactive diluent;
(3) 6.98% of DDFD photoinitiator; and
(4) 0.03% of C&D Green Dye #6.

The C&D Green Dye #6 is added to the resin to increase the absorbance of the resin for higher resolution printing. C&D Green Dye #6 has limited solubility in the final formulation. To mix C&D Green Dye #6 into the resin, the dye is first solubilized in PC at 0.06 wt % at 80° C. The stock solution of 0.06 wt % dye in PC is added to the oligomer to achieve the desired 0.03% concentration in the final resin.

Crystals of the C&D Green Dye #6 may be observed in this resin. C&D Green Dye #6 tends to crystalize in the resin. To prevent crystal aggregation, this resin should be mixed fresh prior to printing.

Example 6

Tri-Arm Oligomer Resin Formulation with Riboflavin Tetrabutyrate

The following ingredients were mixed in the following weight percentages to provide a light polymerizable resin for additive manufacturing:
(1) 52.5% of the tri-arm oligomer prepared in Examples 1-3 above;
(2) 34.2% of propylene carbonate (PC) non-reactive diluent;
(3) 6.98% of DDFD photoinitiator; and
(4) 0.03% of Riboflavin Tetrabutyrate.

Resin mixing is performed by adding the oligomer, PC, DDFD, and Riboflavin tetrabutyrate directly to a thinky cup and mixing at 2000 rpm for 20 min. This resin is stable at room temperature and should be stored in a desiccator to protect from light and moisture.

Example 7

Additive Manufacturing and Post-Processing

With resins prepared as described in the examples above, additive manufacturing is carried out on a Carbon Inc. M1 or M2 apparatus, available from Carbon Inc., 1089 Mills Way, Redwood City, California, 94063, in accordance with standard techniques.

When the resin contains a non-reactive diluent, the objects can experience a global shrinkage upon washing/ extraction by the extent of the non-reactive diluent loading amount. Therefore, a dimensional scaling factor is applied to the part .stl file or 3MF file to enlarge the printed part and intentionally account for subsequent shrinkage during post processing steps.

Post processing of the produced parts can be carried out as follows: After removing the build platform from the apparatus, excess resin is drained from the platform by laying the platform on its side for about 10 minutes. The objects are carefully removed from the platform and washed in an acetone bath for 30 seconds on an orbital shaker 3 times, followed by 5 minutes of drying after each wash. After the third wash, the parts are dried for 20 minutes, and then flood cured for 20 seconds per side, in a PRIME-CURE™ ultraviolet flood curing apparatus at 56 mW/cm².

Next, residual non-reactive diluent (e.g. PC) is extracted from the parts by immersing in acetone and shaking on an orbital shaker at 60 rpm for 1 h. The acetone is exchanged for fresh acetone and the process is repeated overnight. Two more acetone exchanges are conducted (3 h each) for a total of 4 acetone exchanges during the entire extraction process. The objects are then removed from the acetone and vacuum dried overnight at 60° C. Parts containing dye or pigment, such as C&D Green Dye #6 or Riboflavin Tetrabutyrate, should be imaged using a microscope to check for crystals from any insoluble pigment.

The foregoing is illustrative of the present invention, and is not to be construed as limiting thereof. The invention is defined by the following claims, with equivalents of the claims to be included therein.

What is claimed is:

1. A photopolymerizable resin useful for the additive manufacturing of a bioresorbable object, comprising:
   (a) from 5 percent by weight to 90 percent by weight of a photopolymerizable bioresorbable polyester oligomer;
   (b) from 1 percent by weight to 70 percent by weight of non-reactive diluent;
   (c) from 0.1 percent by weight to 10 percent by weight of dihydro-4,4-dimethyl-2,3-furandione (DDFD) photoinitiator;
   (d) an ultraviolet (UV) light absorber;
   (e) optionally, from 1 percent by weight to 50 percent by weight of reactive diluent;
   (f) optionally, from 1 percent by weight to 50 percent by weight of filler; and
   (g) optionally, from 1 percent by weight to 10 percent by weight of at least one additional cross-linking agent.

2. The resin of claim 1, wherein said oligomer comprises a (meth)acrylate terminated and/or thiol terminated bioresorbable polyester oligomer.

3. The resin of claim 1, wherein said oligomer comprises a linear oligomer.

4. The resin of claim 1, wherein said oligomer comprises a branched oligomer.

5. The resin of claim 1, wherein said oligomer comprises degradable ester linkages between constituents selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, wherein:
   A=poly(lactide) (PLA), poly(glycolide) (PGA), poly(lactide-co-glycolide) (PLGA), or polypropylene fumarate (PPF),
   B=polycaprolactone (PCL), polytrimethylene carbonate (PTMC), or poly(caprolactone-co-lactide) (PCLLA), and
   C=polydioxanone (PDX).

6. The resin of claim 5, wherein said oligomer comprises an ABA block, a BAB block, a CBC block, or a BCB block in linear and/or branched form.

7. The resin of claim 6, wherein A is:
(i) poly(lactide);
(ii) poly(glycolide);
(iii) poly(lactide-co-glycolide) containing lactide and glycolide in a molar ratio of (i) from 90:10 to 55:45 lactide:glycolide or (ii) from 45:55 to 10:90 lactide:glycolide;
or any combination of the foregoing.

8. The resin of claim 6, wherein B is:
(i) polycaprolactone;
(ii) polytrimethylene carbonate;
(iii) poly(caprolactone-co-lactide) containing caprolactone and lactide in a molar ratio of 95:5 to 5:95 caprolactone:lactide;
or any combination of the foregoing.

9. The resin of claim 1, wherein said non-reactive diluent is selected from the group consisting of dimethylformamide, dimethylacetamide, N-methyl pyrrolidone (NMP), dimethyl sulfoxide, cyclic carbonate, diethyl adipate, methyl ether ketone, ethyl alcohol, acetone, and combinations thereof.

10. The resin of claim 1, wherein said non-reactive diluent is propylene carbonate.

11. The resin of claim 1, wherein said reactive diluent is present and comprises an acrylate, a methacrylate, a styrene, a vinylamide, a vinyl ether, a vinyl ester, polymers containing any one or more of the foregoing, or a combination of two or more of the foregoing.

12. The resin of claim 1, further comprising at least one additional ingredient selected from: pigments, dyes, active compounds or pharmaceutical compounds, and detectable compounds, and combinations thereof.

13. The resin of claim 1, further comprising a filler.

14. The resin of claim 1, consisting essentially of:
(a) from 10 percent by weight to 80 percent by weight of (meth)acrylate terminated, bioresorbable, branched polyester oligomer; wherein said branched polyester oligomer comprises degradable ester linkages between constituents in an ABA block, BAB block, or AB random composition, where A is poly(lactide) or poly(lactide-co-glycolide), B is polycaprolactone or poly(caprolactone-co-lactide), and said oligomer has a molecular weight (Mn) of from 2 to 6 kilodaltons;
(b) from 5 percent by weight to 50 percent by weight of non-reactive diluent selected from the group consisting of N-methyl pyrrolidone (NMP) and propylene carbonate;
(c) from 0.2 percent by weight to 8 or 10 percent by weight of dihydro-4,4-dimethyl-2,3-furandione (DDFD) photoinitiator;
(d) an ultraviolet (UV) light absorber;
(e) optionally, from 1 percent by weight to 50 percent by weight of reactive diluent;
(f) optionally, from 1 percent by weight to 50 percent by weight of filler; and
(g) optionally, from 1 percent by weight to 10 percent by weight of additional crosslinking agent.

15. The resin of claim 1, wherein said UV light absorber comprises a heterocyclic aromatic compound.

16. A method of making a flexible or elastic bioresorbable object, comprising producing said object by photopolymerizing the resin of claim 1 in the shape of the object.

17. The method of claim 16, further comprising cleaning said object after said producing step.

18. The method of claim 16, further comprising exposing said object to additional light after said producing step to further react unpolymerized constituents therein.

19. The method of claim 16, further comprising extracting residual diluent from said object after said producing step.

20. The method of claim 16, further comprising drying said object to remove extraction solvents therefrom.

21. The method of claim 16, further comprising producing said object in enlarged form to offset shrinkage of said object.

22. The method of claim 16, wherein said object comprises a soft tissue implant.

23. A flexible or elastic bioresorbable object produced by the method of claim 16.

24. The object of claim 23, wherein said object comprises a soft tissue implant.

25. The photopolymerizable resin of claim 1, wherein the resin comprises from 5 percent by weight to 50 percent by weight of the non-reactive diluent.

26. The photopolymerizable resin of claim 25, wherein said non-reactive diluent is propylene carbonate.

* * * * *